US010733959B2

(12) United States Patent
Lee et al.

(10) Patent No.: US 10,733,959 B2
(45) Date of Patent: Aug. 4, 2020

(54) METHOD FOR CONFIGURING INPUT INTERFACE AND ELECTRONIC DEVICE USING SAME

(71) Applicant: Samsung Electronics Co., Ltd., Suwon-si, Gyeonggi-do (KR)

(72) Inventors: Jeongjin Lee, Seoul (KR); Hyelin Lee, Suwon-si (KR); Juhyeon Park, Suwon-si (KR); Kiwon Kim, Suwon-si (KR); Youngho Cho, Seoul (KR); Mooyoung Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/194,876

(22) Filed: Nov. 19, 2018

(65) Prior Publication Data

US 2019/0156788 A1 May 23, 2019

(30) Foreign Application Priority Data

Nov. 21, 2017 (KR) .......................... 10-2017-0155706

(51) Int. Cl.
*G09G 5/12* (2006.01)
*G06F 3/0488* (2013.01)
(Continued)

(52) U.S. Cl.
CPC ........... *G09G 5/12* (2013.01); *G06F 3/04886* (2013.01); *G06F 3/1423* (2013.01);
(Continued)

(58) Field of Classification Search
CPC ....... G06F 2203/04803; G06F 3/04817; G06F 3/04886; G06F 3/1423; G06F 3/1454;
(Continued)

(56) References Cited

U.S. PATENT DOCUMENTS 8,217,904 B2   7/2012 Kim
2003/0100965 A1*  5/2003 Sitrick ................. G09B 15/023
                                                  700/83

(Continued)

FOREIGN PATENT DOCUMENTS

EP          2 712 152 A1   3/2014
KR    10-2014-0089874 A    7/2014

(Continued)

OTHER PUBLICATIONS

International Search Report dated Feb. 26, 2019; International application #: PCT/KR2018/013965.

(Continued)

*Primary Examiner* — Dmitriy Bolotin
(74) *Attorney, Agent, or Firm* — Jefferson IP Law, LLP

(57) ABSTRACT

An electronic device for configuring an input interface and a method therefor are provided. The electronic device includes a memory, a display, and at least one processor electrically connected to the memory and the display, wherein the memory includes instructions that, when executed, enable the at least one processor to perform a connection with an external electronic device, transmit information generated in the electronic device to the external electronic device on the basis of the connection so that the generated information is displayed on a display of the external electronic device, and provide an input interface for controlling the information displayed on the external electronic device via the display when the generated information is displayed on the display of the external electronic device.

25 Claims, 17 Drawing Sheets

(51) Int. Cl.
  *G06F 3/14* (2006.01)
  *H04M 1/725* (2006.01)
  *G09G 5/00* (2006.01)
  *G06F 9/451* (2018.01)
  *G06F 3/0481* (2013.01)

(52) U.S. Cl.
  CPC ........... *G06F 3/1454* (2013.01); *G09G 5/006* (2013.01); *H04M 1/72527* (2013.01); *G06F 3/04817* (2013.01); *G06F 9/452* (2018.02); *G06F 2203/04803* (2013.01); *G09G 2354/00* (2013.01)

(58) Field of Classification Search
  CPC .... G06F 9/452; G09G 2354/00; G09G 5/006; G09G 5/12; H04M 1/72527
  See application file for complete search history.

(56) References Cited

U.S. PATENT DOCUMENTS

| | | |
|---|---|---|
| 2010/0250816 A1 | 9/2010 | Collopy et al. |
| 2012/0050183 A1 | 3/2012 | Lee |
| 2013/0027315 A1 | 1/2013 | Teng |
| 2013/0038548 A1 | 2/2013 | Kitada et al. |
| 2013/0275642 A1 | 10/2013 | Teltz |
| 2014/0191960 A1 | 7/2014 | Jeong et al. |
| 2015/0192989 A1* | 7/2015 | Kim ........................ G06F 3/011 345/156 |
| 2016/0127287 A1* | 5/2016 | Oh ....................... H04L 12/1831 715/752 |
| 2016/0224134 A1 | 8/2016 | Jung et al. |
| 2016/0282906 A1* | 9/2016 | Haga ...................... G06F 1/1632 |
| 2016/0342258 A1 | 11/2016 | Han et al. |
| 2017/0075641 A1* | 3/2017 | Kwon ................... G06F 3/0227 |
| 2017/0123550 A1 | 5/2017 | Lee et al. |
| 2017/0220313 A1* | 8/2017 | Tsubone ................ G06F 3/1423 |
| 2018/0270442 A1* | 9/2018 | Park ...................... G06F 3/0482 |
| 2019/0114133 A1* | 4/2019 | Park ...................... G06F 1/3293 |
| 2019/0146745 A1* | 5/2019 | Kato ........................ H04W 4/80 |

FOREIGN PATENT DOCUMENTS

| | | |
|---|---|---|
| KR | 10-2016-0093307 A | 8/2016 |
| KR | 10-2017-0049991 A | 5/2017 |

OTHER PUBLICATIONS

European office action dated Apr. 17, 2019; Ref. #: 2H/2XV59/MHo281; Application #/Patent #: 18207333.8-1221.

* cited by examiner

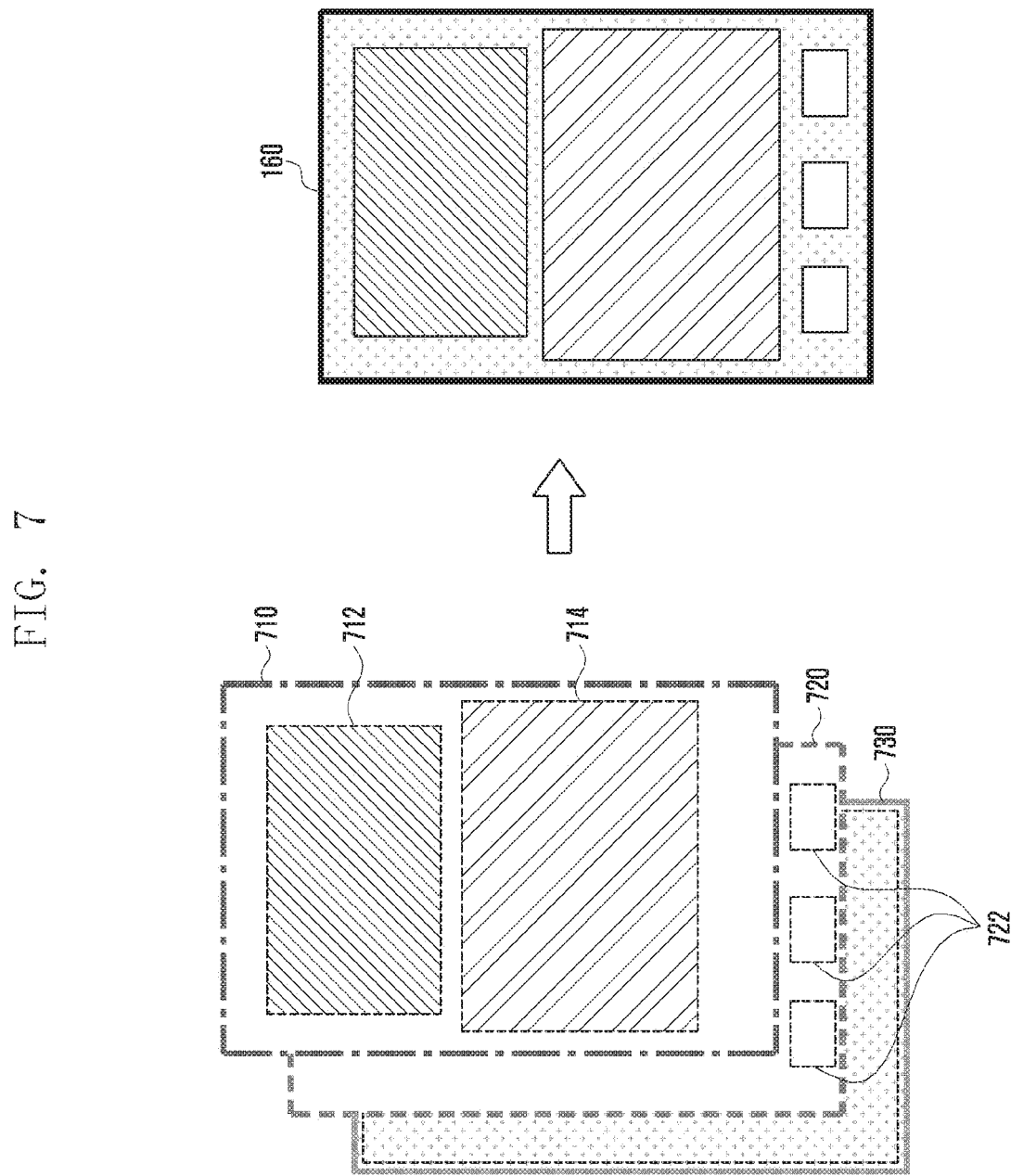

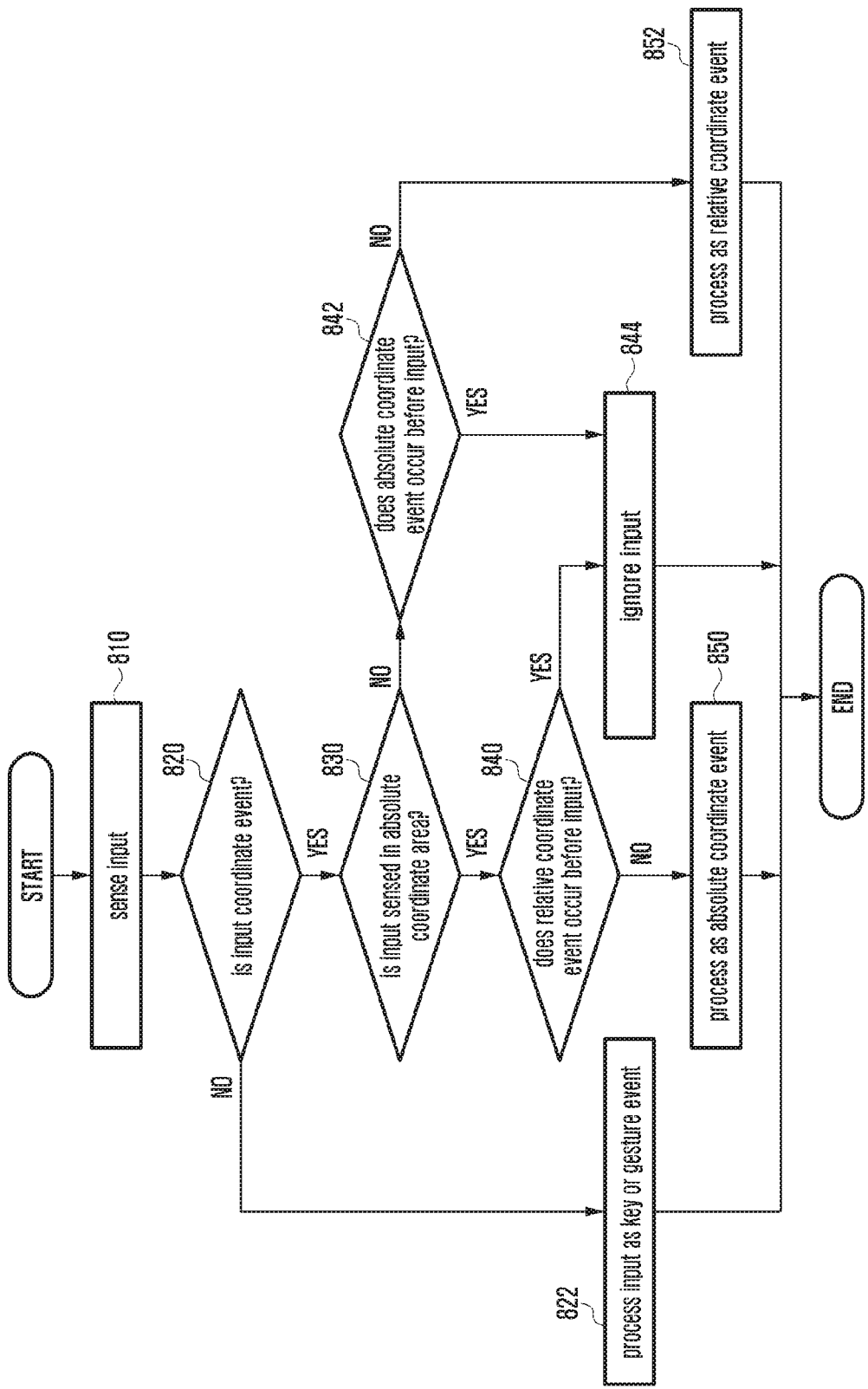

METHOD FOR CONFIGURING INPUT INTERFACE AND ELECTRONIC DEVICE USING SAME

CROSS-REFERENCE TO RELATED APPLICATION(S)

This application is based on and claims priority under 35 U.S.C. § 119 of a Korean patent application number 10-2017-0155706, filed on Nov. 21, 2017, in the Korean Intellectual Property Office, the disclosure of which is incorporated by reference herein in its entirety.

BACKGROUND

1) Field

The disclosure relates to a method for configuring an input interface and an electronic device using the same.

2) Description of Related Art

In recent years, electronic devices, such as a smartphone, can be connected to an external electronic device (e.g., a monitor) so that the smartphone can be used like a computer (e.g., a desktop computer or notebook computer). For example, separately from mirroring of a smartphone, information operated and processed in the smartphone may be transmitted to an external electronic device, thereby creating a working environment similar to that of an existing computer.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a working environment similar to that of an existing computer through a smartphone, an input tool may be necessary. For example, in a working environment of an existing computer, it is possible to transmit an input to the computer through an input tool, such as a keyboard or a mouse. However, in a mobile terminal including a smartphone, it is not easy for a user to carry an input tool, such as a keyboard or a mouse, along with a smartphone, thus having inconvenience in fully utilizing a working environment as with a computer.

Another aspect of the disclosure is to provide an electronic device that includes a memory, a display, and at least one processor electrically connected to the memory and the display, wherein the memory stores instructions which, when executed by the at least one processor, enable the at least one processor to perform a connection with an external electronic device, transmit, based on the connection, information generated in the electronic device to the external electronic device so that the generated information is displayed on a display of the external electronic device, and when the generated information is displayed on the external electronic device, provide an input interface for controlling the information displayed on the display of the external electronic device.

Additional aspects will be set forth in part in the description which follows and, in part, will be apparent from the description, or may be learned by practice of the presented embodiments.

In accordance with an aspect of the disclosure, a method for an electronic device is provided in which the method includes performing a connection with an external electronic device, transmitting information generated in the electronic device to the external electronic device on the basis of the connection so that the generated information is displayed on the external electronic device, and providing an input interface for controlling the information displayed on the external electronic device via the display of the electronic device when the generated information is displayed on the external electronic device.

In accordance with another aspect of the disclosure, an electronic device is provided. The electronic device includes a housing, a touchscreen display exposed through a first portion of the housing, a wireless communication circuit, an electrical connector exposed through a second portion of the housing, at least one processor electrically connected to the touchscreen display, the wireless communication circuit, and the electrical connector, and a memory electrically connected to the at least one processor, wherein the memory stores instructions which, when executed, enable the at least one processor to in a first operation in which the electronic device is not connected to an external display device, display a first screen including a plurality of icons representing a plurality of application programs in a first format on the touch screen display, and in a second operation in which the electronic device is connected to the external display device via the electrical connector, render a second screen including the plurality of icons in a second format, without displaying the second screen on the touchscreen display, provide data related to the second screen to an external display device via the electrical connector so that the second screen is displayed on the external display device, receive a touch input via the touchscreen display, determine a coordinate of the touch input, and adapt the second screen by invoking a button function corresponding to the coordinate, using an absolute area of the coordinate, and/or determining a relative area of the coordinate.

According to various embodiments of the disclosure, a display area of an electronic device (e.g., a smartphone) may be used as an input interface for controlling information that is operated or processed in the electronic device and is displayed on an external electronic device (e.g., a monitor). Accordingly, the user of the electronic device can utilize a working environment, similar to that of a computer, using the electronic device without carrying a separate input tool, such as a keyboard or a mouse.

According to various embodiments of the disclosure, an electronic device may identify context information or status information (hereinafter, referred to as "context information") on the electronic device and may be configured as an input interface corresponding to the identified context information. For example, the electronic device may divide a display area of the electronic device into at least two areas among an application information area, a coordinate area, a key area, and a gesture area and may deploy the divided areas.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 illustrates a display of an electronic device that is divided into different areas according to various embodiments of the disclosure;

FIG. 8 is a flowchart illustrating a method for sensing an input to an electronic device and for processing the sensed input as a different event according to various embodiments of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
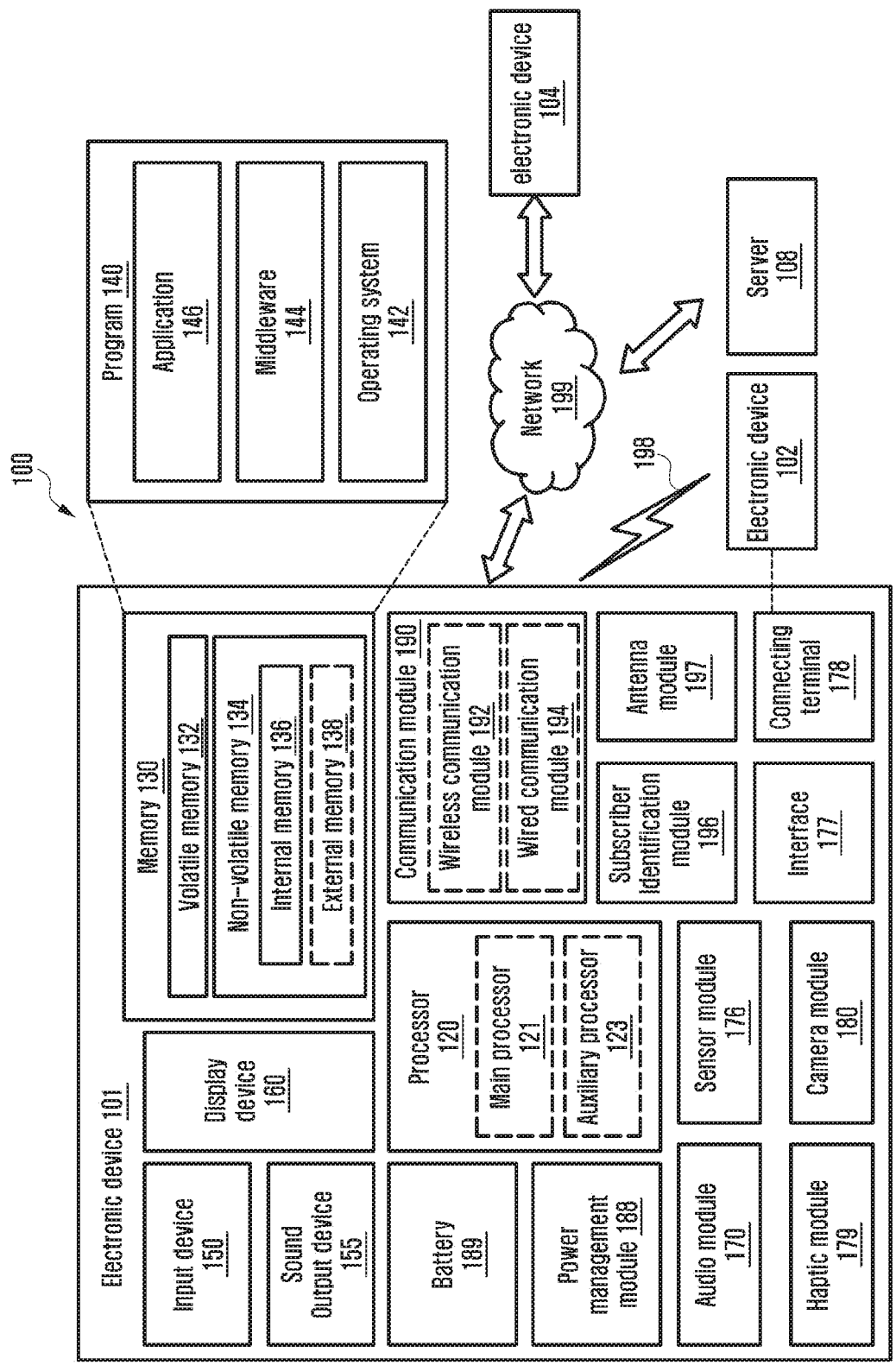
FIG. 1 is a block diagram illustrating an electronic device in a network environment according to various embodiments of the disclosure.

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
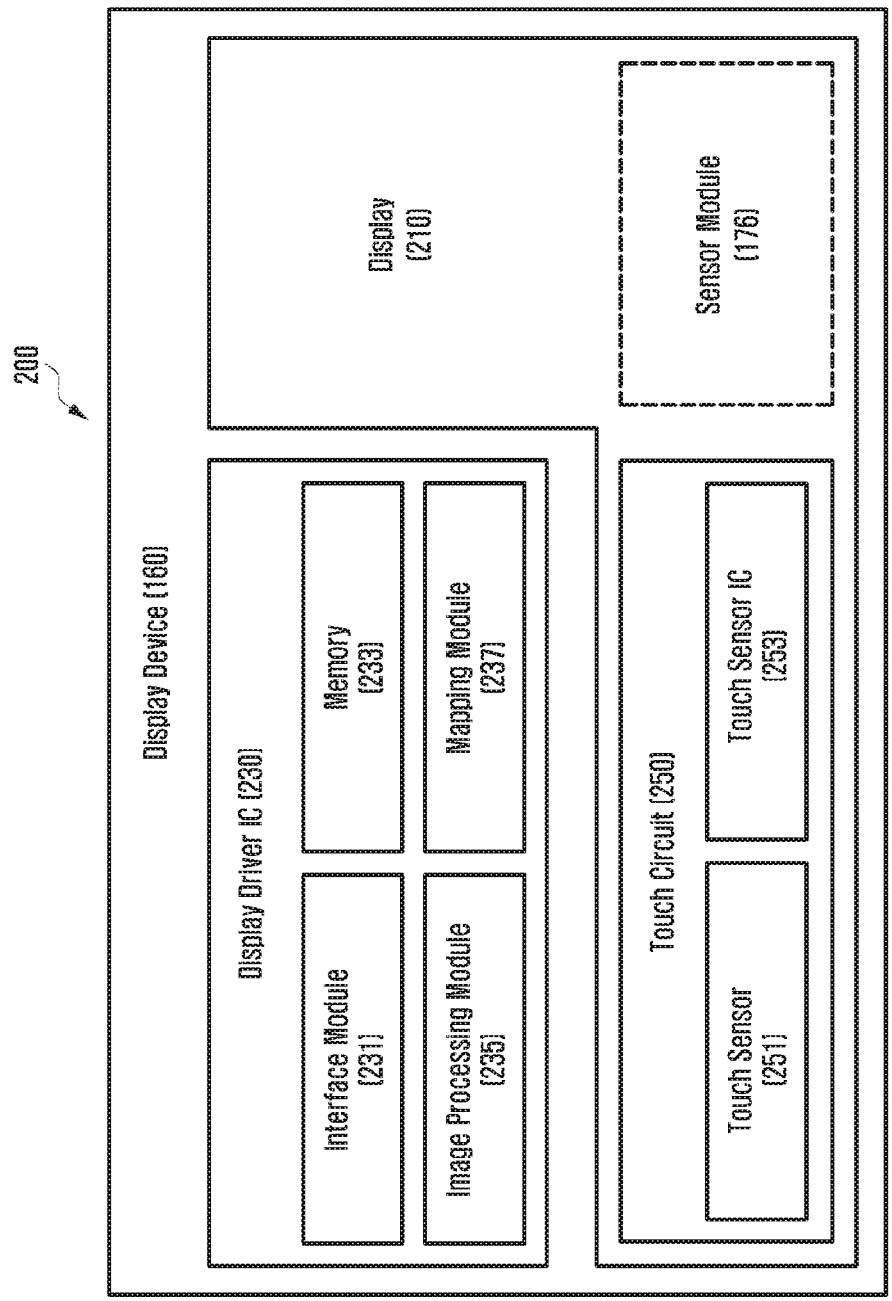
FIG. 2 is a block diagram illustrating a display device according to various embodiments of the disclosure.

FIG. 2 is a block diagram 200 illustrating the display device 160 according to various embodiments of the disclosure.

Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB (red, green, and blue) stripe or a pentile structure (e.g., a PenTile™ structure), of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
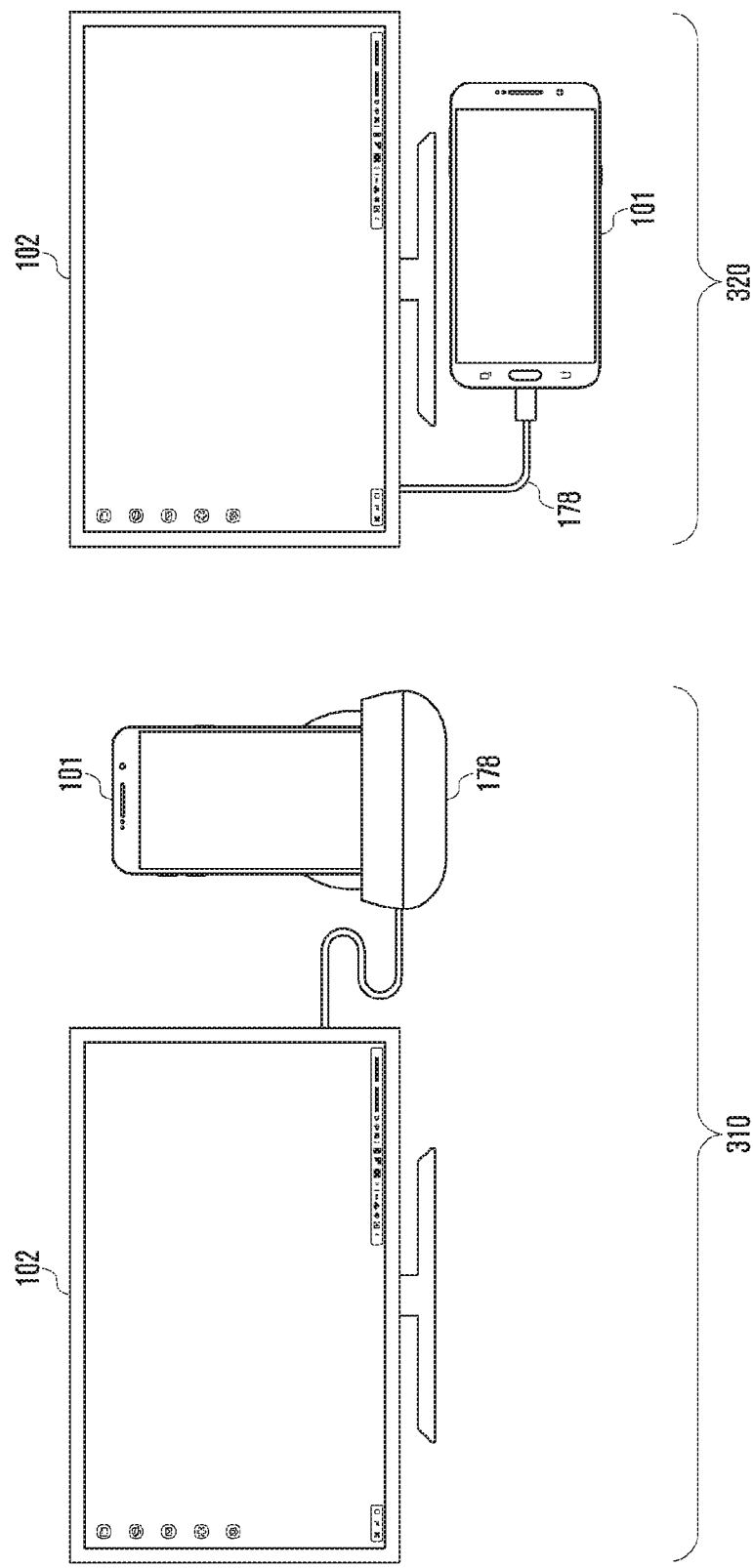
FIG. 3 illustrates a working environment similar to that of a computer, which can be created via an electronic device according to various embodiments of the disclosure.

FIG. 3 illustrates a working environment similar to that of a computer, which can be created via an electronic device according to various embodiments of the disclosure.

Referring to FIG. 3, an electronic device 101 (e.g., a smartphone) may be connected to an external electronic device or an external display device 102 (e.g., a monitor) (hereinafter, referred to as an external electronic device) via a cable or wirelessly and may transmit/receive at least one data thereto/therefrom. The electronic device 101 may transmit information operated/processed in the electronic device 101 to the external electronic device 102 and may control the operated/processed information to be displayed on the external electronic device 102. For example, the electronic device 101 may display, using mirroring, the same information as displayed on a display device 160 of the electronic device 101 on the external electronic device 102. In another example, unlike mirroring, the electronic device 101 may transmit information to the external electronic device 102 in order to implement a working environment identical or similar to that on a general computer (e.g., a desktop or notebook computer). A computer-like working environment that can be implemented through the electronic device 101 may be referred to as a desktop experience system or a DeX Station™. As an example, when a mobile device is connected to an external display device (e.g., via a docking station), the mobile device may launch a mode on the connected external display device in which one or more applications can be opened in one or more display settings.

According to various embodiments, the electronic device 101 may use a docking station as a connection terminal 178 to implement a desktop experience system 310. According to various embodiments, the electronic device 101 may use a universal serial bus (USB) cable as a connection terminal 178 to implement a desktop experience system 320.

Although not shown, the electronic device 101 may also use a wireless charger as a connection terminal to implement a desktop experience system.

According to various embodiments, the electronic device 101 may be coupled to the external electronic device 102 using the connection terminal 178, via an electrical connector exposed through a portion of the electronic device 101.

According to various embodiments, a case where the electronic device 101 operates without being connected to the external electronic device 102 may be defined as a first operation. In this case, the display device 160 (e.g., a display) of the electronic device 101 may display a first screen including a plurality of icons representing a plurality of application programs in a first format.

According to various embodiments, a case where the electronic device 101 operates being electrically connected to the external electronic device 102 may be defined as a second operation. In this case, the electronic device 101 may render a second screen including a plurality of icons representing a plurality of application programs in a second format. Here, the second screen may be displayed on the external electronic device 102 without being displayed on the display device 160 of the electronic device 101. To this end, the electronic device 101 may provide data associated with the second screen to the external electronic device 102 via the electrical connector.

Figure 4:
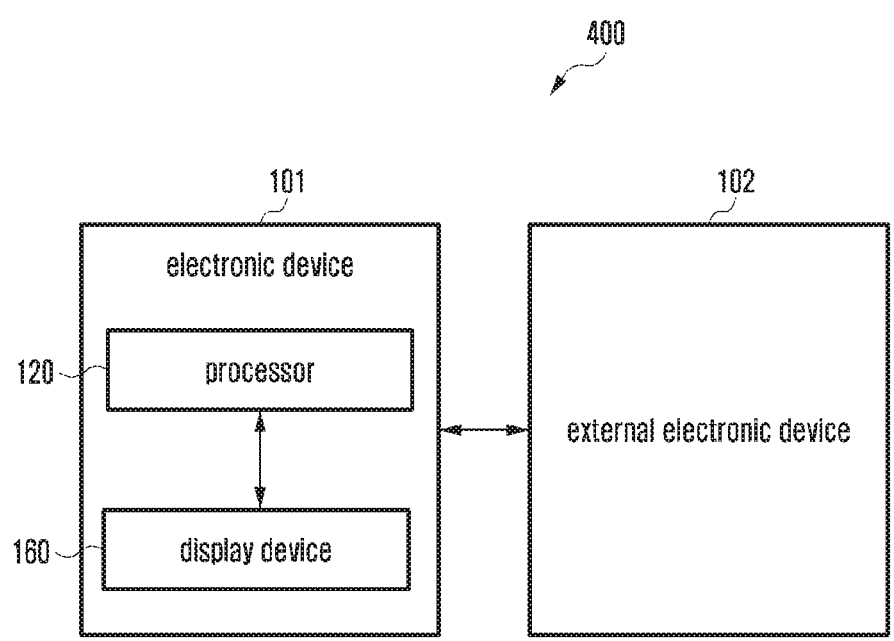
FIG. 4 is a block diagram illustrating a desktop experience system for an electronic device according to various embodiments of the disclosure.

FIG. 4 is a block diagram illustrating a desktop experience system for an electronic device according to various embodiments of the disclosure.

Referring to FIG. 4, the desktop experience system 400 may include an electronic device 101, an external electronic device 102, and the like. Although not shown in FIG. 4, the connection terminal 178 (e.g., the docking station, the USB cable, the wireless charger, or the like) of FIG. 3 may also be included in the desktop experience system 400.

According to various embodiments, the electronic device 101 may include a processor 120, a display device 160, and the like. Although not shown in FIG. 4, the electronic device 101 may include the components shown in the block diagram of FIG. 1. For example, the electronic device 101 may include a sensor module 176, an interface 177, a camera module 180, a communication module 190, and the like.

According to various embodiments, the electronic device 101 may include a housing. The housing may refer to an external structure (e.g., a frame, a case, or the like) surrounding at least one module and/or component included in the electronic device 101. For example, the at least one module and/or component (e.g., the processor 120) included in the electronic device 101 may be disposed inside the housing and may not be outwardly exposed. Alternatively, a portion of the at least one module and/or component (e.g., the display device 160) included in the electronic device 101 may be disposed inside the housing so as not to be exposed, while another portion thereof may be exposed outside the housing.

According to various embodiments, the electronic device 101 may operate as an input interface for controlling information operated/processed in the electronic device 101, which is displayed on the external electronic device 102 in the desktop experience system 400. Accordingly, a user of the electronic device 101 can use the desktop experience system 400 via the electronic device 101 without having a separate input tool (e.g., a keyboard, a mouse, or the like).

According to various embodiments, the processor 120 of the electronic device 101 may control the display device 160 to operate as an input interface. For example, the electronic device 101 may configure an input interface by dividing a display 210 of the display device 160 into a plurality of areas and may receive various inputs from the user through the divided areas. For example, the display 210 may operate as an input interface that is divided into an application information area, a coordinate area, a key area or a button area (hereinafter, referred to as a key area), a gesture area, and the like.

According to various embodiments, the application information area of the display 210 may refer to an area that displays information on an application that is being executed or is scheduled to be executed in the electronic device 101. For example, the electronic device 101 may display at least part of an application execution screen in the application information area of the display 210, not on the external electronic device 102.

According to various embodiments, the coordinate area of the display 210 may function as an input tool for controlling information displayed on the external electronic device 102. For example, the coordinate area of the display 210 may perform an operation similar to a coordinate input via a smartphone, a mouse, a touchpad, and the like. The coordinate area of the display 210 may include an absolute coordinate area, a relative coordinate area, and a combination of an absolute coordinate area and a relative coordinate area.

According to various embodiments, the absolute coordinate area of the display 210 may be mapped to correspond to the resolution of the external electronic device 102 and the position of information displayed on the external electronic device 102. Accordingly, when the user of the electronic device 101 selects a (1, 1) point in the absolute coordinate area, this selection may be processed as selecting information displayed at a (1, 1) point on the external electronic device 102. For example, an input via the absolute coordinate area may be similar to a normal input operation on a smartphone.

According to various embodiments, the relative coordinate area of the display 210 uses the relative values of a coordinate at which a user input starts and a coordinate at which the user input ends and may function similarly to a normal mouse or touchpad. For example, a relative area of a coordinate may be determined on the basis of at least one of a gesture input, a swipe input, a scroll input, a zoom-in input, and a zoom-out input.

According to various embodiments, the key area of the display 210 may display a key corresponding to the function of an application being executed on the electronic device 101 or a key (e.g., a shortcut key) for executing a particular application or function. For example, the key area may include at least one of a home key, a menu key, and a back key. According to various embodiments, the electronic device 101 may change the configuration of the input interface on the basis of an input received through the key area.

According to various embodiments, the gesture area of the display 210 may sense a gesture corresponding to the function of an application being executed on the electronic device 101 or a gesture for executing a particular application or function. For example, the electronic device 101 may change the configuration of the input interface on the basis of an input received through the gesture area.

According to various embodiments, the processor 120 of the electronic device 101 may change the configuration of the input interface on the basis of context information on the electronic device 101. For example, the context information may include at least one of a currently executed application, a currently displayed screen, a currently executed function, an application scheduled to be executed, an input key, an input gesture, input coordinate information, user customizing, sensor information, pen input information, location information on the electronic device 101, status information on the battery 189, and external device connection/release information. A specific embodiment in which the electronic device 101 changes the configuration of the input interface according to the context information on the electronic device 101 will be described below with reference to FIGS. 9A to 9C, 10A to 10C, and 11A to 11C.

Figure 5:
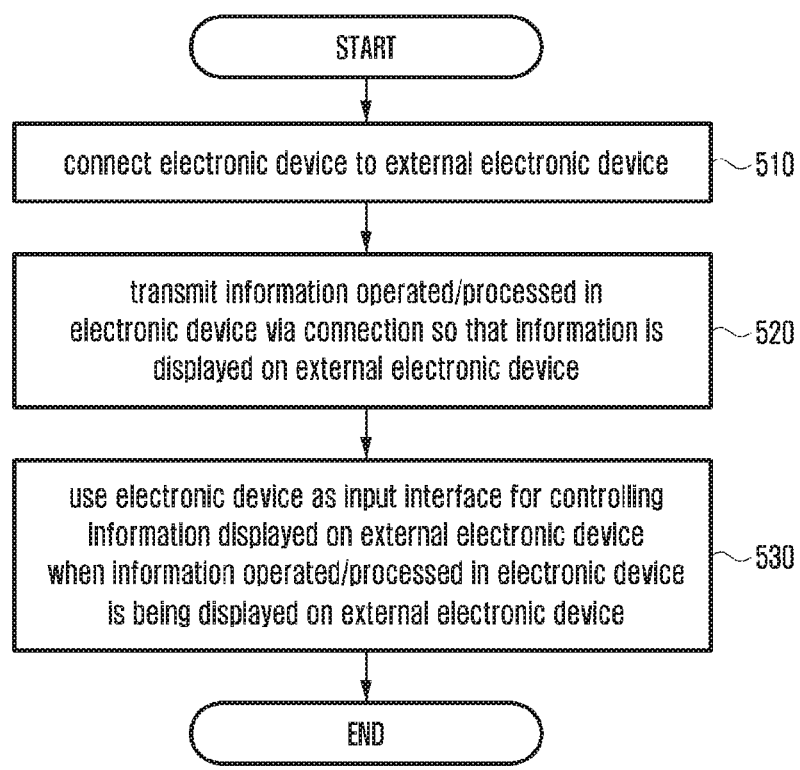
FIG. 5 is a flowchart illustrating a method for using an electronic device as an input interface for controlling information displayed on an external electronic device according to various embodiments of the disclosure.

FIG. 5 is a flowchart illustrating a method for using an electronic device as an input interface for controlling information displayed on an external electronic device according to various embodiments of the disclosure.

Referring to FIG. 5, in operation 510, the electronic device 101 may connect the electronic device 101 and the external electronic device 102. The electronic device 101 may perform a wired or wireless connection with the external electronic device 102. For example, the electronic device 101 may perform a wired connection with the external electronic device 102 via a connection terminal 178 (e.g., a docking station, a USB cable, a wireless charger, or the like). In another example, the electronic device 101 may perform a wireless connection with the external electronic device 102 via a wireless communication module 192 (e.g., Bluetooth, Wi-Fi, or the like).

According to various embodiments, in operation 520, the electronic device 101 may transmit information that is operated/processed in the electronic device via the connection so that the information may be displayed on the external electronic device 102. For example, unlike known mirroring, the electronic device 101 may transmit the information to the external electronic device 102 in order to implement a working environment identical or similar to that of a computer (e.g., a desktop or notebook computer).

According to various embodiments, in operation 530, when the information operated/processed in the electronic device 101 is being displayed on the external electronic device 102, the electronic device 101 may use the external electronic device 102 as an input interface for controlling the information displayed on the external electronic device 102. For example, a user of the electronic device 101 may use the electronic device 101 as the input interface in order to perform a particular operation (e.g., to execute any function or application) on the basis of the information displayed on the external electronic device 102. Accordingly, the user of the electronic device 101 can use a desktop experience system via the electronic device 101 without having a separate input tool (e.g., a keyboard, a mouse, or the like). According to various embodiments, the electronic device 101 may configure the input interface by dividing a display 210 of a display device 160 into a plurality of areas and may receive various inputs from the user through the divided areas. For example, the electronic device 101 may operate as the input interface by dividing the display 210 into an application information area, a coordinate area, a key area, a gesture area, and the like.

Figure 6:
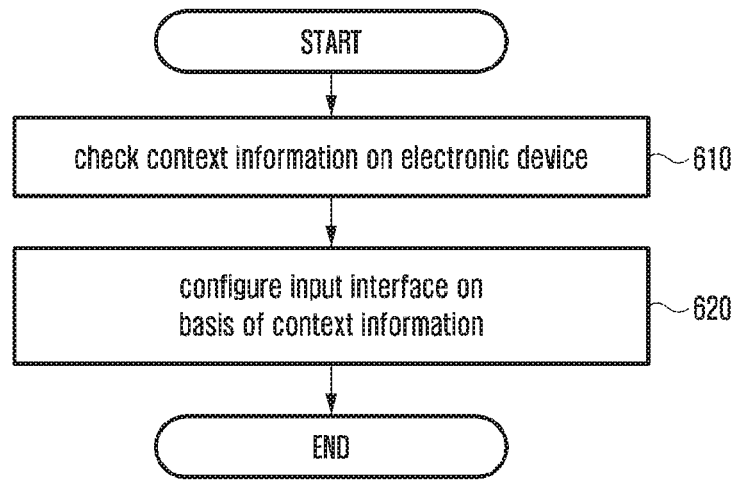
FIG. 6 is a flowchart illustrating a method for configuring an input interface on the basis of context information on an electronic device according to various embodiments of the disclosure.

FIG. 6 is a flowchart illustrating a method for configuring an input interface on the basis of context information on an electronic device according to various embodiments of the disclosure.

Referring to FIG. 6, in operation 610, the electronic device 101 may check context information on the electronic device 101. For example, the electronic device 101 may use, as the context information, at least one of a currently executed application, a currently displayed screen, a currently executed function, an application scheduled to be executed, an input key, an input gesture, input coordinate information, user customizing, sensor information, pen input information, location information on the electronic device 101, status information on the battery 189, and external device connection/release information.

According to various embodiments, in operation 620, the electronic device 101 may configure an input interface on the basis of the context information. For example, the electronic device 101 may variously change the area of a display 210 on the basis of the context information obtained in operation 610. For example, the electronic device 101 may control the display 210 to operate and display, on the basis of the context information, an input interface that is divided into an application information area, a coordinate area, a key area, a gesture area, and the like. A specific embodiment in which the electronic device 101 changes the configuration of the input interface according to the context information on the electronic device 101 will be described below with reference to FIGS. 9A to 9C, 10A to 10C, and 11A to 11C.

FIG. 7 illustrates a display of an electronic device that is divided into different areas according to various embodiments of the disclosure.

Referring to FIG. 7, a display device 160 of the electronic device 101 may have an overlapping layer structure. For example, the display device 160 may have a structure in which a first layer 710, a second layer 720, and a third layer 730 overlap each other.

According to various embodiments, the electronic device 101 may process a coordinate event through the first layer 710. For example, the first layer 710 may include an absolute coordinate area 712 and a relative coordinate area 714. Accordingly, when the electronic device 101 senses a touch input in an area out of the absolute coordinate area 712 and the relative coordinate area 714, the electronic device 101 may not process the touch input as a coordinate event. Here, when an absolute coordinate and a relative coordinate overlap each other, there may be confusion about coordinate recognition, and thus it may be appropriate to manage the areas in one layer.

According to various embodiments, the electronic device 101 may process a key event through the second layer 720. For example, the second layer 720 may include a key area 722. The electronic device 101 may map a particular function or application to at least one key included in the key area 722. Accordingly, the electronic device 101 may perform an operation relating to the function or application corresponding to the key area 722.

According to various embodiments, the electronic device 101 may process a gesture event through the third layer 730. The electronic device 101 may receive a gesture from a user via the third layer 730 and may perform an operation corresponding to the received gesture. For example, the electronic device 101 may process an operation, such as zoom-in, zoom-out, scroll, and an application execution, on the basis of the gesture event. Here, since the gesture event may overlap with the coordinate event or the key event, the gesture event may be processed not only in the third layer 730 but also together in the first layer 710 or the second layer 720.

FIG. 8 is a flowchart illustrating a method for sensing an input to an electronic device and for processing the sensed input as a different event according to various embodiments of the disclosure.

Referring to FIG. 8, in operation 810, the electronic device 101 may sense an input from a user. For example, a display device 160 (e.g., the display 210) of the electronic device 101 may receive the input from the user.

According to various embodiments, in operation 820, the electronic device 101 may determine whether the input sensed in operation 810 is a coordinate event. For example, when the input from the user is sensed in an area set as a coordinate area, the input may be identified as a coordinate event (e.g., an absolute coordinate event or a relative coordinate event).

According to various embodiments, when the sensed input is not a coordinate event, the electronic device 101 may process the input sensed in operation 810 as a key or gesture event in operation 822.

According to various embodiments, when the sensed input is a coordinate event, the electronic device 101 may determine whether the input sensed in operation 810 is sensed in an absolute coordinate area in operation 830.

According to various embodiments, when the sensed input is sensed in the absolute coordinate area, the electronic device 101 may check whether a relative coordinate event occurs before the input sensed in operation 810 in operation 840. For example, the relative coordinate event occurring before the input sensed in operation 810 may be an input made within a short time such that the input can be determined as a continuous input. Accordingly, it is possible to determine whether the input sensed in operation 810 continues from a previous input event and whether the input in operation 810 is made by the user's manipulation mistake.

According to various embodiments, when a relative coordinate event does not occur before the input sensed in the absolute coordinate area, the electronic device 101 may process the input in operation 810 as an absolute coordinate event in operation 850. In another example, when a relative coordinate event occurs before the input sensed in the absolute coordinate area, the electronic device 101 may ignore the input in operation 810 the electronic device 101 in operation 844.

According to various embodiments, when the sensed input is not sensed in the absolute coordinate area (e.g., when the sensed input is determined to be sensed in a relative coordinate area), the electronic device 101 may check whether an absolute coordinate event occurs before the input sensed in operation 810 in operation 842. For example, the absolute coordinate event occurring before the input sensed in operation 810 may be an input made within a short time such that the input can be determined as a continuous input. Accordingly, it is possible to determine whether the input sensed in operation 810 continues from a previous input event and whether the input in operation 810 is made by the user's manipulation mistake.

According to various embodiments, when an absolute coordinate event does not occur before the input sensed in the relative coordinate area, the electronic device 101 may process the input in operation 810 as a relative coordinate event in operation 852. In another example, when an absolute coordinate event occurs before the input sensed in the relative coordinate area, the electronic device 101 may ignore the input in operation 810 the electronic device 101 in operation 844.

Figure 9A:
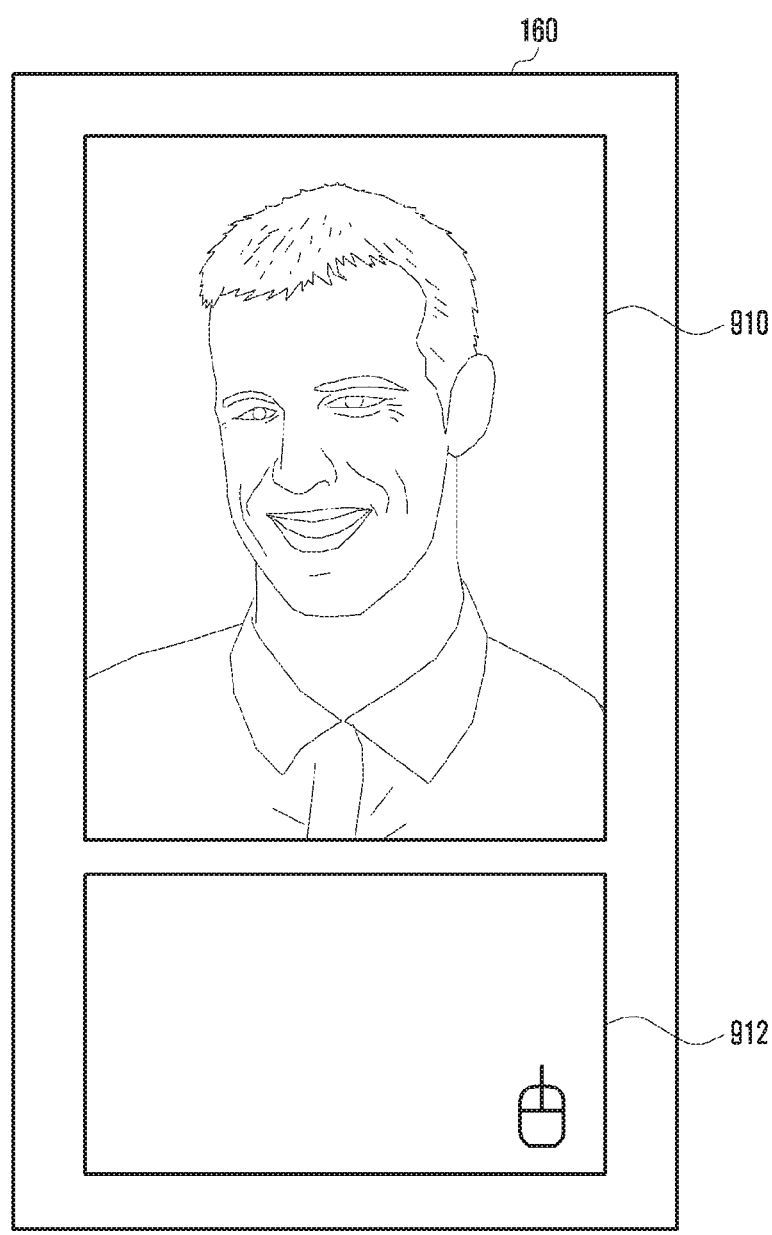
FIGS. 9A, 9B, and 9C illustrate various methods for providing an input interface during the execution of a particular application on an electronic device according to various embodiments of the disclosure.
Figure 9B:
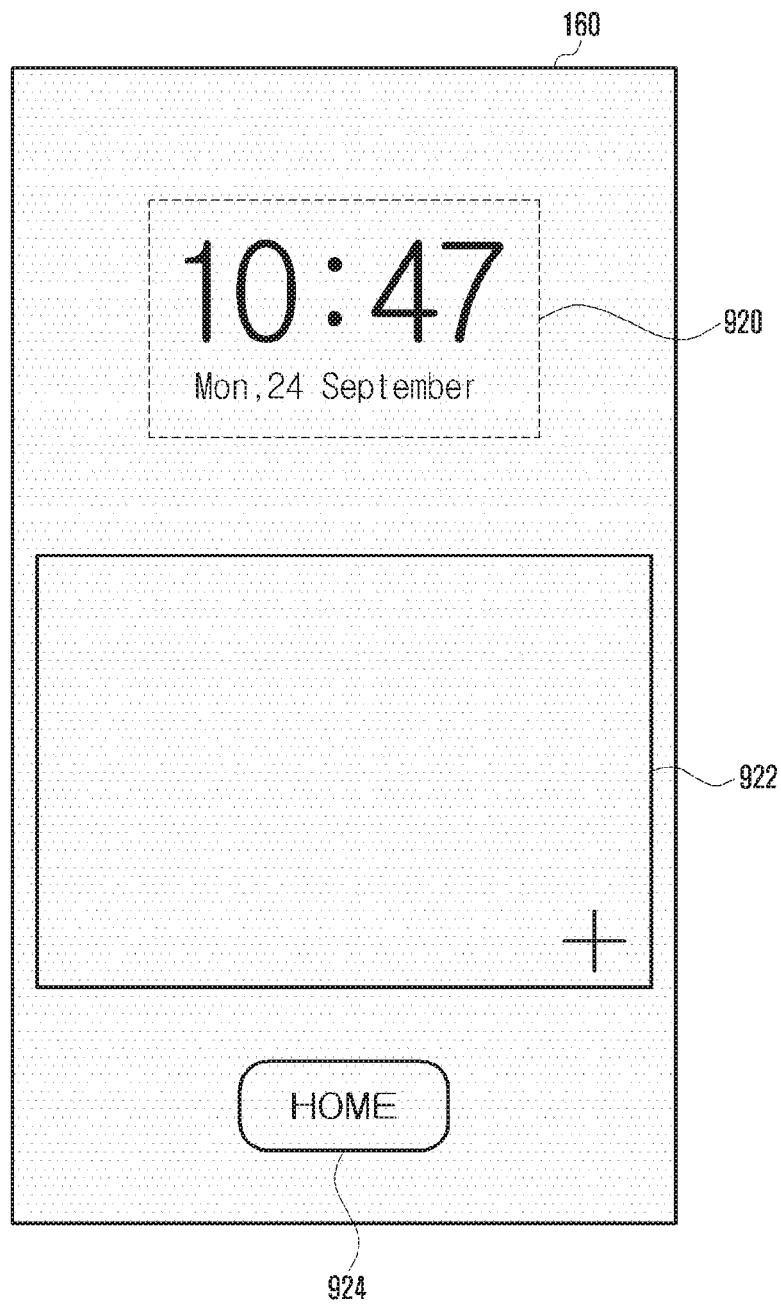
Figure 9C:
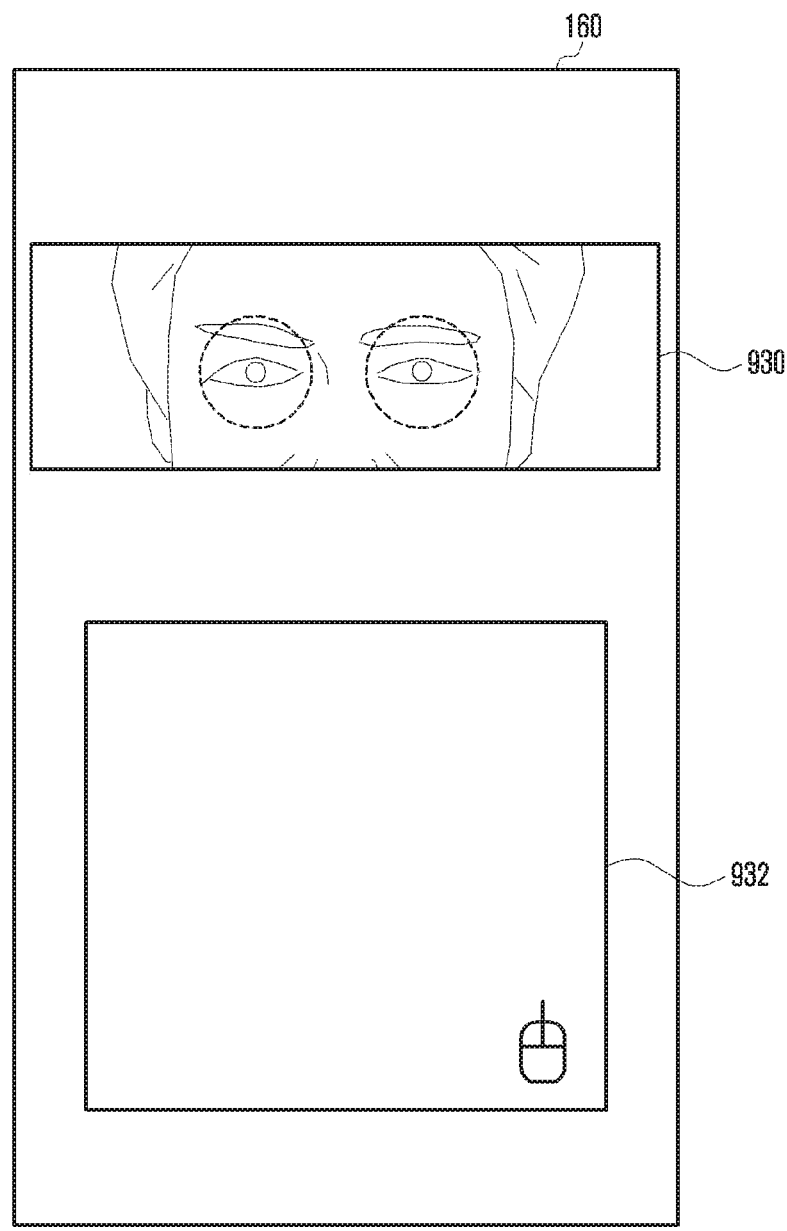

FIGS. 9A, 9B, and 9C illustrate various methods for providing an input interface during the execution of a particular application on an electronic device according to various embodiments of the disclosure.

Referring to FIG. 9A, when the electronic device 101 is connected to an external electronic device 102 to configure a desktop experience system, the electronic device 101 may operate as an input interface of the desktop experience system. For example, the electronic device 101 may separately dispose an application information area 910 and a coordinate area 912 on a display device 160. In this case, the electronic device 101 may utilize the coordinate area 912 as the input interface of the desktop experience system. Further, the electronic device 101 may perform a video call with a counterpart through the application information area 910.

Referring to FIG. 9B, when the electronic device 101 is connected to an external electronic device 102 to configure a desktop experience system, the electronic device 101 may operate as an input interface of the desktop experience system. For example, the electronic device 101 may separately dispose an application information area (e.g., a widget) 920, a coordinate area 922, and a key area (e.g., home) 924 on the display device 160. In this case, the electronic device 101 may utilize the coordinate area 922 and the key area 924 as the input interface of the desktop experience system.

Referring to FIG. 9C, when the electronic device 101 is connected to an external electronic device 102 to configure a desktop experience system, the electronic device 101 may operate as an input interface of the desktop experience system. For example, the electronic device 101 may separately dispose an application information area 930 and a coordinate area 932 on a display device 160. In this case, the electronic device 101 may utilize the coordinate area 932 as the input interface of the desktop experience system. Further, the electronic device 101 may process security information through the application information area 930. For example, while operating as the desktop experience system, the electronic device 101 may perform an application or function for user authentication (e.g., iris recognition, face contour recognition, and the like).

According to various embodiments, although FIGS. 9A to 9C show the coordinate areas 912, 922, and 933 of the display device 160 as one area, the coordinate areas 912, 922, and 933 may be an absolute coordinate area, a relative coordinate area, or a combination of an absolute coordinate area and a relative coordinate area.

Figure 10A:
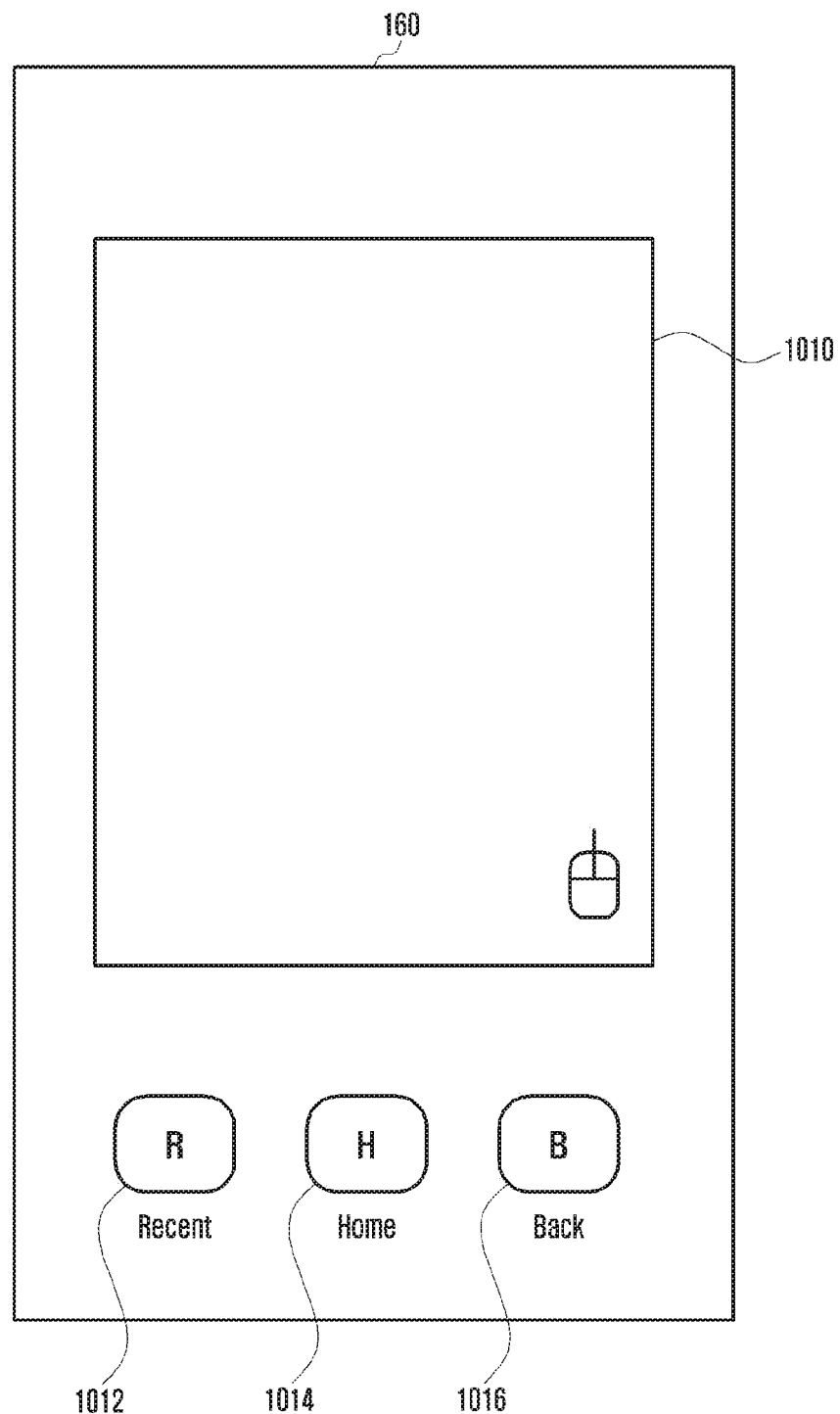
FIGS. 10A, 10B, and 10C illustrate various methods for utilizing an electronic device oriented in a portrait mode as an input interface according to various embodiments of the disclosure.
Figure 10B:
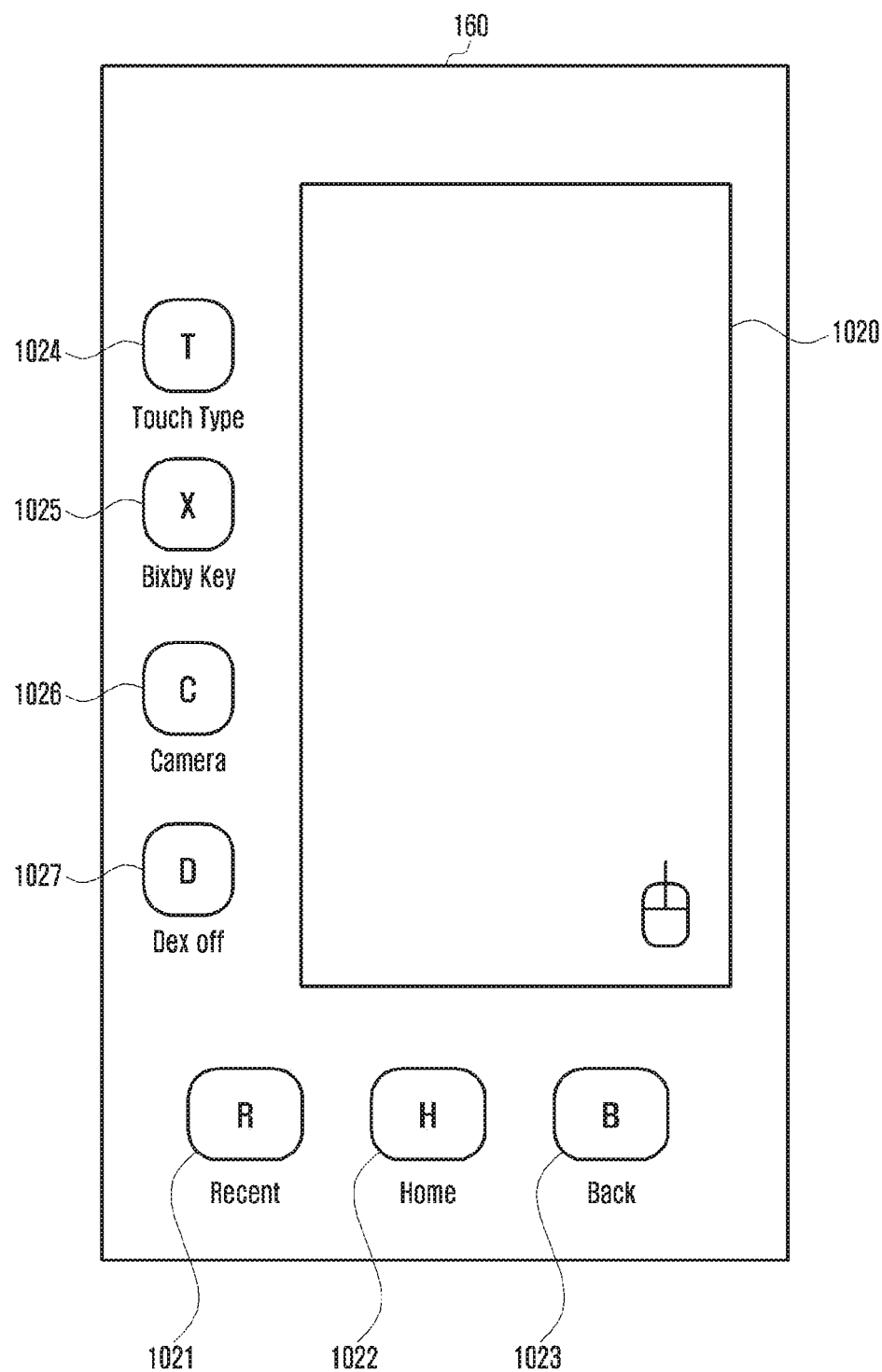
Figure 10C:
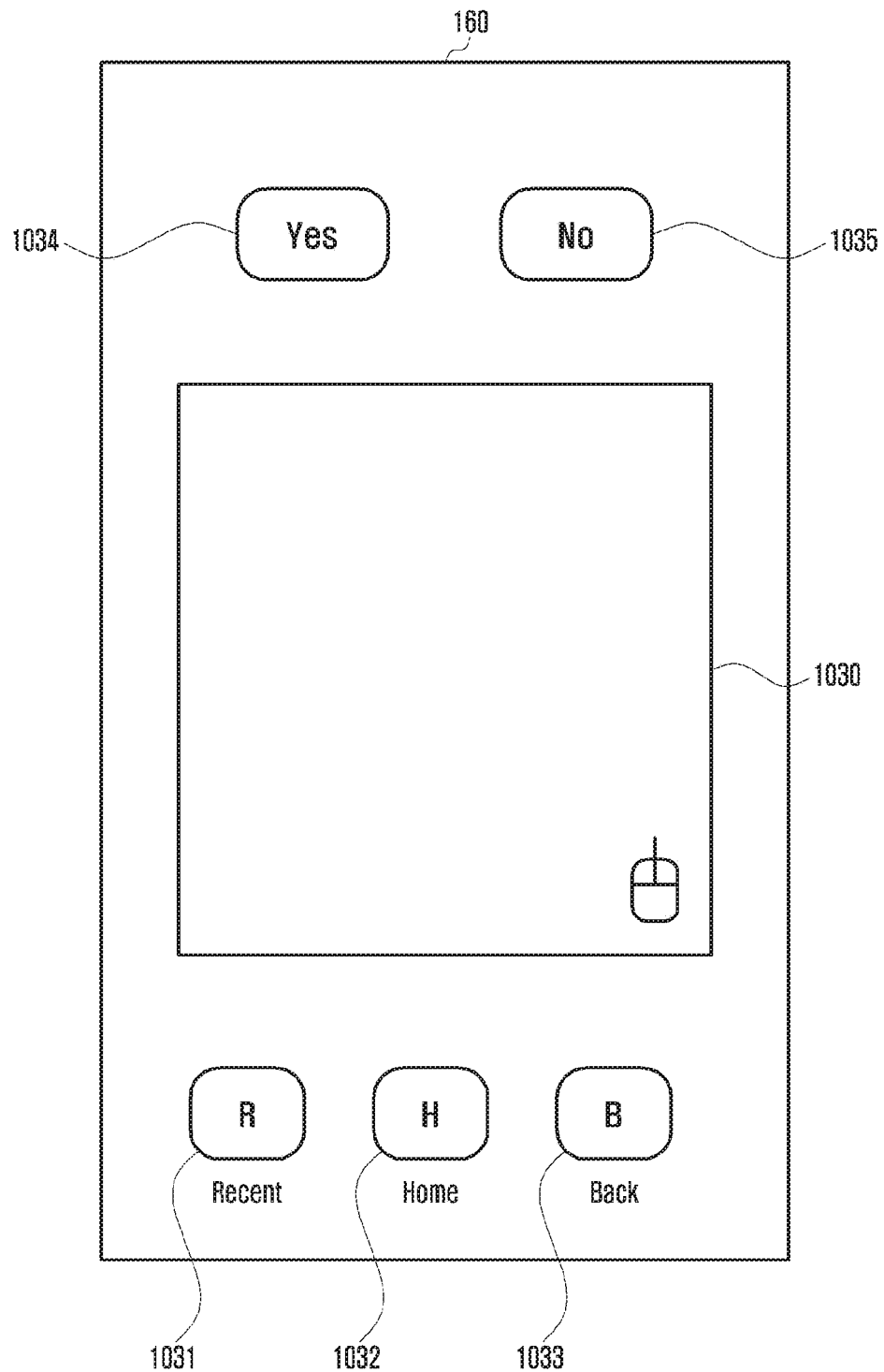

FIGS. 10A to 10C illustrate various methods for utilizing an electronic device oriented in a portrait mode as an input interface according to various embodiments of the disclosure.

Referring to FIG. 10A, when the electronic device 101 is connected to an external electronic device 102 to configure a desktop experience system, the electronic device 101 may operate as an input interface of the desktop experience system. For example, the electronic device 101 may separately dispose a coordinate area 1010 and key areas 1012, 1014, and 1016 on a display device 160. In this case, the electronic device 101 may utilize the coordinate area 1010 and the key areas 1012, 1014, and 1016 as the input interface of the desktop experience system.

According to various embodiments, when the coordinate area 1010 is a relative coordinate area, the electronic device 101 may move a cursor displayed on the external electronic device 102 through an input on the coordinate area 1010. Further, when the coordinate area 1010 is an absolute coordinate area, the electronic device 101 may select information displayed on the external electronic device 102 corresponding to the position of a coordinate on the coordinate area 1010.

According to various embodiments, the electronic device 101 may execute a function or application corresponding to each of the key areas 1012, 1014, and 1016 according to a user's input. For example, when the key area 1012 is selected, the electronic device 101 may perform control to display a recently executed list of the desktop experience system on the external electronic device 102. For example, when the key area 1014 is selected, the electronic device 101 may perform control to display a home screen of the desktop experience system on the external electronic device 102. For example, when the key area 1016 is selected, the electronic device 101 may perform control to display a previously executed screen of the desktop experience system on the external electronic device 102.

Referring to FIG. 10B, when the electronic device 101 is connected to an external electronic device 102 to configure a desktop experience system, the electronic device 101 may operate as an input interface of the desktop experience system. For example, the electronic device 101 may separately dispose a coordinate area 1020 and key areas 1021 to 1027 on the display device 160. In this case, the electronic device 101 may utilize the coordinate area 1020 and the key areas 1021 to 1027 as the input interface of the desktop experience system.

According to various embodiments, when the coordinate area 1020 is a relative coordinate area, the electronic device 101 may move a cursor displayed on the external electronic device 102 through an input on the coordinate area 1020. Further, when the coordinate area 1020 is an absolute coordinate area, the electronic device 101 may select information displayed on the external electronic device 102 corresponding to the position of a coordinate on the coordinate area 1020.

According to various embodiments, the electronic device 101 may execute a function or application corresponding to each of the key areas 1021 to 1027 according to a user's input. For example, when the key area 1021 is selected, the electronic device 101 may perform control to display a recently executed list of the desktop experience system on the external electronic device 102. For example, when the key area 1022 is selected, the electronic device 101 may perform control to display a home screen of the desktop experience system on the external electronic device 102. For example, when the key area 1023 is selected, the electronic device 101 may perform control to display a previously executed screen of the desktop experience system on the external electronic device 102. For example, when the key area 1024 is selected, the electronic device 101 may change an attribute of the coordinate area 1020 (e.g., from the absolute coordinate area to the relative coordinate area, from the relative coordinate area to the absolute coordinate area, or to a user or application customizing coordinate area). For example, when the key area 1025 is selected, the electronic device 101 may activate a voice recognition function (e.g., Bixby) in the desktop experience system. For example, when the key area 1026 is selected, the electronic device 101 may activate a camera function in the desktop experience system. For example, when the key area 1027 is selected, the electronic device 101 may exit the desktop experience system and may return to an existing execution screen of a smartphone.

Referring to FIG. 10C, when the electronic device 101 is connected to an external electronic device 102 to configure a desktop experience system, the electronic device 101 may operate as an input interface of the desktop experience system. For example, the electronic device 101 may separately dispose a coordinate area 1030 and key areas 1031 to 1035 on the display device 160. In this case, the electronic device 101 may utilize the coordinate area 1030 and the key areas 1031 to 1035 as the input interface of the desktop experience system.

According to various embodiments, when the coordinate area 1030 is a relative coordinate area, the electronic device 101 may move a cursor displayed on the external electronic device 102 through an input on the coordinate area 1030. Further, when the coordinate area 1030 is an absolute coordinate area, the electronic device 101 may select information displayed on the external electronic device 102 corresponding to the position of a coordinate on the coordinate area 1030.

According to various embodiments, the electronic device 101 may execute a function or application corresponding to each of the key areas 1031 to 1035 according to a user's input. For example, when the key area 1031 is selected, the electronic device 101 may perform control to display a recently executed list of the desktop experience system on the external electronic device 102. For example, when the key area 1032 is selected, the electronic device 101 may perform control to display a home screen of the desktop experience system on the external electronic device 102. For example, when the key area 1033 is selected, the electronic device 101 may perform control to display a previously executed screen of the desktop experience system on the external electronic device 102. For example, when the electronic device 101 needs to receive a selective answer (e.g. yes or no, allow or deny, O or X, and the like) from the user, the electronic device 101 may display the key areas 1034 and 1035 related to the selective answer.

According to various embodiments, the electronic device 101 may replace the function of the key areas with a button or a key provided on an accessory (e.g., a pen or the like) detachable from the electronic device 101. For example, the electronic device 101 may perform an operation, such as switching the coordinate area or exiting the desktop experience system, when the button provided on the pen is pressed.

According to various embodiments, the electronic device 101 may sense that an external electronic device (e.g., a mouse, a keyboard, a touch pad, or the like) is connected to the electronic device 101 wirelessly or via a cable. The electronic device 101 may change at least a portion of the configuration of the input interface as the connection of the external electronic device is sensed. For example, when the external electronic device is a mouse, the relative coordinate area is less necessary in the input interface and thus may be changed to another area (e.g., an application information area, an absolute coordinate area, or a key area). For example, when an external electronic device (e.g., a keyboard) is connected while the electronic device 101 is displaying a keyboard in an application information area or a key area, it is less necessary to display the keyboard, and thus the area may be changed to another area.

Figure 11A:
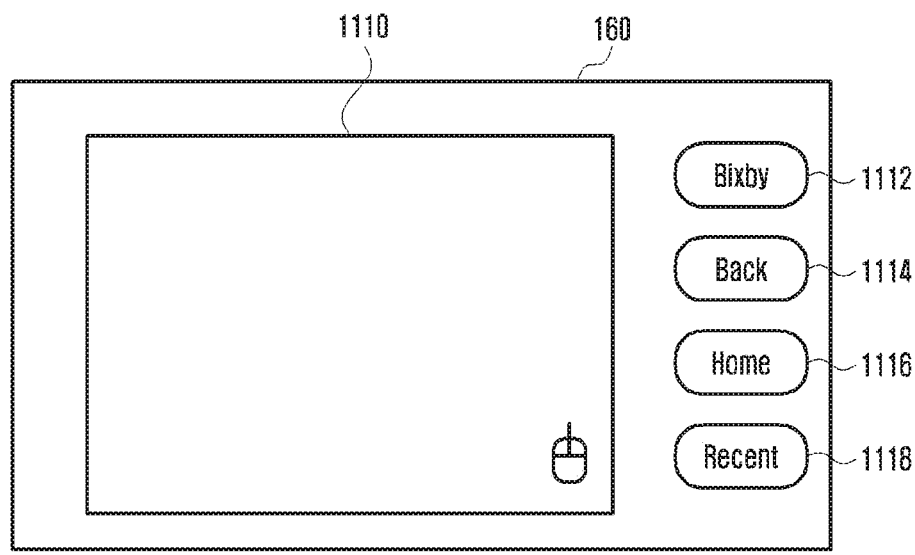
FIGS. 11A, 11B, and 11C illustrate various methods for utilizing an electronic device oriented in a landscape mode as an input interface according to various embodiments of the disclosure.
Figure 11B:
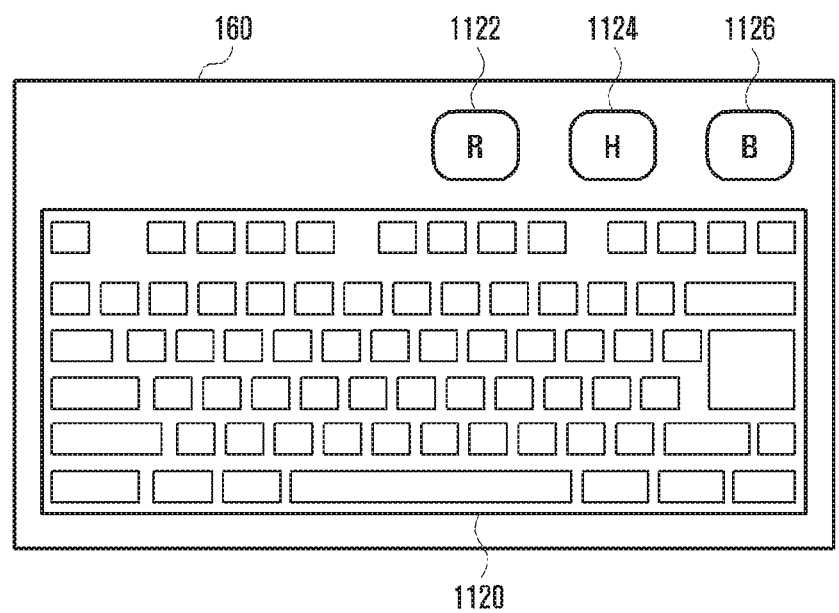
Figure 11C:
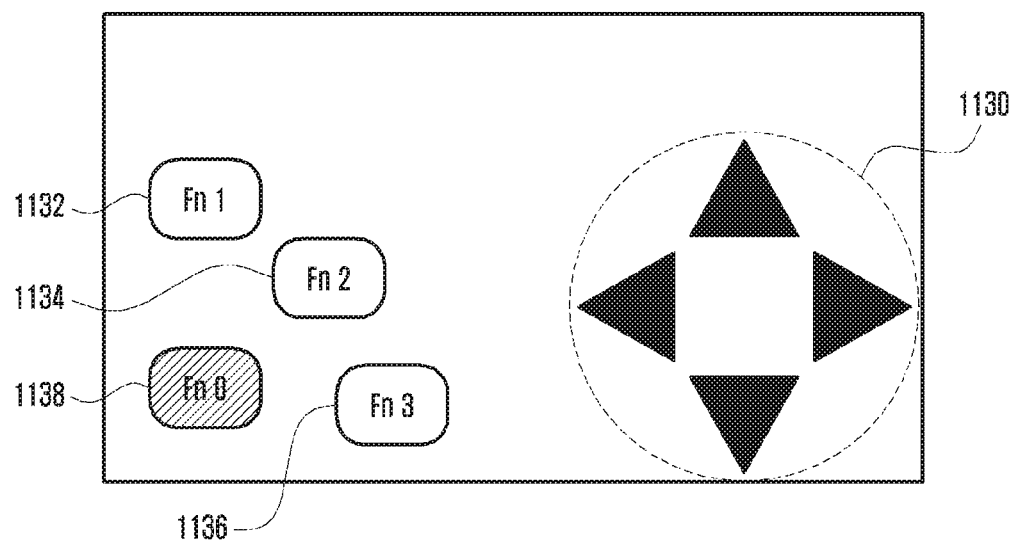

FIGS. 11A to 11C illustrate various methods for utilizing an electronic device oriented in a landscape mode as an input interface according to various embodiments of the disclosure.

According to various embodiments, referring to FIGS. 11A to 11C, the electronic device 101 may sense the orientation or rotation of the electronic device 101 and may change the configuration of the input interface on the basis of the sensed orientation or rotation. For example, when the electronic device 101 rotates from the portrait mode to the landscape mode, the input interface may be changed from the portrait input interface illustrated in FIGS. 9A to 9C, and 10A to 10C to the landscape input interface illustrated in FIGS. 11A to 11C.

Referring to FIG. 11A, when the electronic device 101 is connected to an external electronic device 102 to configure a desktop experience system, the electronic device 101 may operate as an input interface of the desktop experience system. For example, the electronic device 101 may separately dispose a coordinate area 1110 and key areas 1112, 1114, 1116, and 1118 on a display device 160. In this case, the electronic device 101 may utilize the coordinate area 1110 and the key areas 1112, 1114, 1116, and 1118 as the input interface of the desktop experience system.

According to various embodiments, when the coordinate area 1110 is a relative coordinate area, the electronic device 101 may move a cursor displayed on the external electronic device 102 through an input on the coordinate area 1110. Further, when the coordinate area 1110 is an absolute coordinate area, the electronic device 101 may select information displayed on the external electronic device 102 corresponding to the position of a coordinate on the coordinate area 1110.

According to various embodiments, the electronic device 101 may execute a function or application corresponding to each of the key areas 1112, 1114, 1116, 1118 according to a user's input. For example, when the key area 1112 is selected, the electronic device 101 may activate a voice recognition function (e.g., Bixby) in the desktop experience system. For example, when the key area 1114 is selected, the electronic device 101 may perform control to display a previously executed screen of the desktop experience system on the external electronic device 102. For example, when the key area 1116 is selected, the electronic device 101 may perform control to display a home screen of the desktop experience system on the external electronic device 102. For example, when the key area 1118 is selected, the electronic device 101 may perform control to display a recently executed list of the desktop experience system on the external electronic device 102.

Referring to FIG. 11B, when the electronic device 101 is connected to an external electronic device 102 to configure a desktop experience system, the electronic device 101 may operate as an input interface of the desktop experience system. For example, when the electronic device 101 is oriented in the landscape mode, the electronic device 101 may display a keypad, which is the same as/similar to a keyboard, in an application information area 1120 so that the user can easily input characters. In this case, when the keypad is small, the user has inconvenience in input, and thus the electronic device 101 may set the size of the keypad to cover most of the area of the display device 160. The electronic device 101 may allocate key areas 1122, 1124, and 1126 on the display device 160 separately from the keypad. In this case, the electronic device 101 may utilize the application information area 1120 and the key areas 1122, 1124, and 1126 as the input interface of the desktop experience system.

According to various embodiments, the electronic device 101 may execute a function or application corresponding to each of the key areas 1122, 1124, and 1126 according to a user's input. For example, when the key area 1122 is selected, the electronic device 101 may perform control to display a recently executed list of the desktop experience system on the external electronic device 102. For example, when the key area 1124 is selected, the electronic device 101 may perform control to display a home screen of the desktop experience system on the external electronic device 102. For example, when the key area 1126 is selected, the electronic device 101 may perform control to display a previously executed screen of the desktop experience system on the external electronic device 102.

Referring to FIG. 11C, when the electronic device 101 is connected to an external electronic device 102 to configure a desktop experience system, the electronic device 101 may operate as an input interface of the desktop experience system. For example, the electronic device 101 may change the configuration of the input interface corresponding to an application or function executed on the electronic device 101.

According to various embodiments, an application (e.g., a game, a media player, or the like) may be executed on the electronic device 101, and information on the application may be displayed on the external electronic device 102. In this case, since the user obtains the information on the application through the external electronic device 102, it may be meaningless to display an execution screen of the application on the electronic device 101. Accordingly, the electronic device 101 may utilize the display device 160 as an input interface for manipulating the application. For example, when a game application is running on the electronic device 101, the electronic device 101 may display an arrow key 1130 and function keys 1132, 1134, 1136, and 1138 on the display device 160. Accordingly, the user of the electronic device 101 does not need to have a separate controller for manipulating a game screen and can be more involved in the game screen.

An electronic device according to various embodiments may include a memory; a display; and a processor electrically connected to the memory and the display, wherein the memory may include instructions that, when executed, enable the processor to perform a connection with an external electronic device; transmit information generated in the electronic device to the external electronic device on the basis of the connection so that the generated information is displayed on the external electronic device; and provide an input interface for controlling the information displayed on the external electronic device via the display when the generated information is displayed on the external electronic device.

When executed, the memory may enable the processor to identify at least one piece of context information associated with the electronic device; and provide the input interface on the basis of the identified context information.

The context information may include at least one of information on an application that is being executed or is scheduled to be executed on the electronic device, key input information, gesture input information, coordinate input information, user customizing information, sensor information, pen input information, location information on the electronic device 101, status information on a battery 189, and external accessory connection/release information.

The input interface may include at least two areas of an application information area, a coordinate area, a key area, and a gesture area.

The coordinate area may include an absolute coordinate area, a relative coordinate area, and a combination of the absolute coordinate area and the relative coordinate area.

When executed, the memory may enable the processor to receive a key input event or a gesture input event through the input interface; and change an attribute of a coordinate area displayed on the input interface corresponding to the key input event.

When executed, the memory may enable the processor to detect a connection or release of an external accessory to or from the electronic device; and change a display of the input interface corresponding to the connection or release of the external accessory.

The external accessory may include at least one of a touch pad, a pen, a mouse, and a keyboard.

When executed, the memory may enable the processor to detect a rotation of the electronic device; and change a display of the input interface corresponding to the rotation of the electronic device.

When executed, the memory may enable the processor to identify an attribute of an application that is being executed or is scheduled to be executed on the electronic device; and change a display of the input interface on the basis of the attribute of the application.

A method of an electronic device according to various embodiments may include performing a connection with an external electronic device; transmitting information generated in the electronic device to the external electronic device on the basis of the connection so that the generated information is displayed on the external electronic device; and providing an input interface for controlling the information displayed on the external electronic device via the display of the electronic device when the generated information is displayed on the external electronic device.

The method may include identifying at least one piece of context information associated with the electronic device; and providing the input interface on the basis of the identified context information.

The context information may include at least one of information on an application that is being executed or is scheduled to be executed on the electronic device, key input information, gesture input information, coordinate input information, user customizing information, sensor information, pen input information, location information on the electronic device 101, status information on a battery 189, and external accessory connection/release information.

The input interface may include at least two areas of an application information area, a coordinate area, a key area, and a gesture area.

The coordinate area may include an absolute coordinate area, a relative coordinate area, and a combination of the absolute coordinate area and the relative coordinate area.

The method may include receiving a key input event or a gesture input event through the input interface; and changing an attribute of a coordinate area displayed on the input interface corresponding to the key input event.

The method may include detecting a connection or release of an external accessory to or from the electronic device; and changing a display of the input interface corresponding to the connection or release of the external accessory.

The external accessory may include at least one of a touch pad, a pen, a mouse, and a keyboard.

The method may include detecting a rotation of the electronic device; and changing a display of the input interface corresponding to the rotation of the electronic device.

The method may include identifying an attribute of an application that is being executed or is scheduled to be executed on the electronic device; and changing a display of the input interface on the basis of the attribute of the application.

An electronic device according to various embodiments may include a housing; a touchscreen display exposed through a first portion of the housing; a wireless communication circuit; an electrical connector exposed through a second portion of the housing; a processor electrically connected to the touchscreen display, the wireless communication circuit, and the electrical connector; and a memory electrically connected to the processor, wherein the memory may include instructions that, when executed, enable the processor to display a first screen including a plurality of icons representing a plurality of application programs in a first format on the touch screen display, in a first operation in which the electronic device is not connected to an external display device; and render a second screen including the plurality of icons in a second format, without displaying the second screen on the touchscreen display, provide data related to the second screen to an external display device via the electrical connector so that the second screen is displayed on the external display device, receive a touch input via the touchscreen display, determine a coordinate of the touch input, and adapt the second screen by invoking a button function corresponding to the coordinate, using an absolute area of the coordinate, and/or determining a relative area of the coordinate, in a second operation in which the electronic device is connected to the external display device via the electrical connector.

The button function may include at least one of a home key, a menu key, and a back key.

The relative area of the coordinate may be determined on the basis of at least one of a gesture input, a swipe input, a scroll input, a zoom-in input, and a zoom-out input.

The memory may include instructions that, when executed, enable the processor to determine a status of the electronic device; and adapt the second screen by invoking the button function using at least one of the absolute area of the coordinate and the relative area on the basis of at least part of the determination.

The status may be related to at least one of a currently executed application program, a currently displayed screen, and a currently executed function of the electronic device.

The memory may include instructions that, when executed, enable the processor to provide a first area of the touchscreen display for receiving a first touch input to invoke the button function, a second area of the touchscreen display for receiving a second touch input using the absolute area of the coordinate, and/or a third area of the touchscreen display for receiving a third touch input by determining the relative area of the coordinate.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a memory;
    a display; and
    at least one processor electrically connected to the memory and the display,
    wherein the memory stores instructions which, when executed by the at least one processor, cause the at least one processor to:
        perform a connection with an external electronic device,
        transmit, using the connection, information generated by the electronic device to the external electronic device so that the generated information is displayed on a display of the external electronic device,
        when the generated information is displayed on the external electronic device, provide on the electronic device an input interface for controlling the information displayed on the display of the external electronic device, identify an attribute of an application that is being executed or is scheduled to be executed on the electronic device, and change a display of the input interface based on the attribute of the application.

2. The electronic device of claim 1, wherein the instructions, when executed by the at least one processor, further cause the at least one processor to:

identify at least one piece of context information associated with the electronic device; and provide the input interface based on the identified context information.

3. The electronic device of claim 2, wherein the context information comprises at least one of information on an application that is being executed or is scheduled to be executed on the electronic device, key input information, gesture input information, coordinate input information, user customizing information, sensor information, pen input information, location information on the electronic device, battery status information, or external accessory connection/release information.

4. The electronic device of claim 1, wherein the input interface comprises at least two areas of an application information area, a coordinate area, a key area, or a gesture area.

5. The electronic device of claim 4, wherein the coordinate area comprises an absolute coordinate area, a relative coordinate area, and a combination of the absolute coordinate area and the relative coordinate area.

6. The electronic device of claim 1, wherein the instructions, when executed by the at least one processor, further cause the at least one processor to:

receive a key input event or a gesture input event through the input interface; and change an attribute of a coordinate area displayed on the input interface corresponding to the key input event.

7. The electronic device of claim 1, wherein the instructions, when executed by the at least one processor, further cause the at least one processor to:

detect a connection or release of an external accessory to or from the electronic device; and change a display of the input interface corresponding to the connection or release of the external accessory.

8. The electronic device of claim 7, wherein the external accessory comprises at least one of a touch pad, a pen, a mouse, or a keyboard.

9. The electronic device of claim 1, wherein the instructions, when executed by the at least one processor, further cause the at least one processor to:

detect a rotation of the electronic device; and change a display of the input interface corresponding to the rotation of the electronic device.

10. A method for an electronic device, the method comprising:

performing a connection with an external electronic device;

transmitting, using the connection, information generated by the electronic device to the external electronic device so that the generated information is displayed via the external electronic device;

providing on the electronic device, when the generated information is displayed on the external electronic device, an input interface for controlling the information displayed on the external electronic device;

identifying an attribute of an application that is being executed or is scheduled to be executed on the electronic device; and changing a display of the input interface based on the attribute of the application.

11. The method of claim 10, further comprising:

identifying at least one piece of context information associated with the electronic device; and providing the input interface based on the identified context information.

12. The method of claim 11, wherein the context information comprises at least one of information on an application that is being executed or is scheduled to be executed on the electronic device, key input information, gesture input information, coordinate input information, user customizing information, sensor information, pen input information, location information on the electronic device, battery status information, or external accessory connection/release information.

13. The method of claim 10, wherein the input interface comprises at least two areas of an application information area, a coordinate area, a key area, or a gesture area.

14. The method of claim 13, wherein the coordinate area comprises an absolute coordinate area, a relative coordinate area, and a combination of the absolute coordinate area and the relative coordinate area.

15. The method of claim 10, further comprising:

receiving a key input event or a gesture input event through the input interface; and changing an attribute of a coordinate area displayed on the input interface corresponding to the key input event.

16. The method of claim 10, further comprising:

detecting a connection or release of an external accessory to or from the electronic device; and changing a display of the input interface corresponding to the connection or release of the external accessory.

17. The method of claim 16, wherein the external accessory comprises at least one of a touch pad, a pen, a mouse, or a keyboard.

18. The method of claim 10, further comprising:

detecting a rotation of the electronic device; and changing a display of the input interface corresponding to the rotation of the electronic device.

19. An electronic device comprising:

a housing;

a touchscreen display exposed through a first portion of the housing;

a wireless communication circuit;

an electrical connector exposed through a second portion of the housing;

at least one processor electrically connected to the touchscreen display, the wireless communication circuit, and the electrical connector; and a memory electrically connected to the at least one processor, wherein the memory stores instructions which, when executed by the at least one processor, cause the at least one processor to:

in a first operation in which the electronic device is not connected to an external display device, display a first screen comprising a plurality of icons representing a plurality of application programs in a first format on the touch screen display, and in a second operation in which the electronic device is connected to the external display device via the electrical connector:

render a second screen comprising the plurality of icons in a second format, without displaying the second screen on the touchscreen display, provide data related to the second screen to an external display device via the electrical connector so that the second screen is displayed on the external display device, receive a touch input via the touchscreen display, determine a coordinate of the touch input on the touchscreen display, and adapt the second screen displayed on the external display device by invoking a button function corresponding to the coordinate, using an absolute area of the coordinate, and/or determining a relative area of the coordinate, and wherein the at least one processor is configured to identify an attribute of an application program which is currently executed or scheduled to be executed on the electronic device and to change a display of the first screen based on the attribute of the application program.

20. The electronic device of claim 19, wherein the button function comprises at least one of a home key, a menu key, or a back key.

21. The electronic device of claim 19, wherein the relative area of the coordinate is determined based on at least one of a gesture input, a swipe input, a scroll input, a zoom-in input, or a zoom-out input.

22. The electronic device of claim 19, wherein the instructions, when executed by the at least one processor, further cause the at least one processor to:

determine a status of the electronic device; and adapt the second screen by invoking the button function using at least one of the absolute area of the coordinate or the relative area based on at least part of the determination.

23. The electronic device of claim 22, wherein the status is related to at least one of the application program, a currently displayed screen, or a currently executed function of the electronic device.

24. The electronic device of claim 19, wherein the instructions, when executed by the at least one processor, further cause the at least one processor to provide:

a first area of the touchscreen display for receiving a first touch input to invoke the button function;

a second area of the touchscreen display for receiving a second touch input using the absolute area of the coordinate; and/or a third area of the touchscreen display for receiving a third touch input by determining the relative area of the coordinate.

25. The electronic device of claim 19, wherein, when the electronic device is docked to a docking station which is connected to the external display device, the electronic device launches a mode on the connected external display device in which one or more applications can be opened.

* * * * *